United States Patent
Asano et al.

(10) Patent No.: US 9,843,175 B2
(45) Date of Patent: Dec. 12, 2017

(54) METHOD FOR MANUFACTURING INSERT-MOLDED BUS BAR, AND INSERT-MOLDED BUS BAR

(71) Applicants: ATECS CORPORATION, Osaka (JP); NAGASE & CO., LTD., Osaka (JP)

(72) Inventors: Norishige Asano, Osaka (JP); Toshiaki Nakazawa, Tokyo (JP)

(73) Assignees: ATECS CORPORATION, Osaka (JP); NAGASE & CO., LTD., Osaka (JP)

( * ) Notice: Subject to any disclaimer, the term of this patent is extended or adjusted under 35 U.S.C. 154(b) by 65 days.

(21) Appl. No.: 14/424,708

(22) PCT Filed: Sep. 2, 2013

(86) PCT No.: PCT/JP2013/073554
§ 371 (c)(1),
(2) Date: Feb. 27, 2015

(87) PCT Pub. No.: WO2014/038515
PCT Pub. Date: Mar. 13, 2014

(65) Prior Publication Data
US 2015/0229110 A1    Aug. 13, 2015

(30) Foreign Application Priority Data

Sep. 4, 2012   (JP) ................. 2012-194291

(51) Int. Cl.
*H01B 1/00* (2006.01)
*H02G 5/00* (2006.01)
(Continued)

(52) U.S. Cl.
CPC ......... *H02G 1/00* (2013.01); *B29C 45/14221* (2013.01); *B29C 45/14336* (2013.01);
(Continued)

(58) Field of Classification Search
CPC ........ H01R 43/048; H01R 43/24; H01R 4/70; H02G 1/00; H02G 5/005; H02G 5/00; H02G 5/002; H02G 5/007
(Continued)

(56) References Cited

U.S. PATENT DOCUMENTS 3,466,745 A * 9/1969 Stopp ................. H01B 7/00
174/117 FF
3,476,871 A * 11/1969 Erdle ................. H02G 5/005
174/117 FF
(Continued)

FOREIGN PATENT DOCUMENTS

CN    101291034    10/2008
DE    10104035     8/2002
(Continued)

OTHER PUBLICATIONS

Search report from Japan, dated Dec. 3, 2013.
(Continued)

Primary Examiner — Timothy Thompson
Assistant Examiner — Rhadames J Alonzo Miller
(74) Attorney, Agent, or Firm — Greenblum & Bernstein, P.L.C.

(57) ABSTRACT

A method for manufacturing an insert-molded bus bar includes the steps of: preparing a first bus bar having a through hole and a second bus bar having a protrusion corresponding to the through hole; preparing a mold having therein a swaging member capable of swaging the protrusion; placing the first and second bus bars in the mold with the protrusion being inserted into the through hole; swaging the first and second bus bars using the swaging member of the mold to obtain connected bus bars that are the bus bars connected to each other; and injecting a molding material around the connected bus bars that are the bus bars con-
(Continued)

nected to each other by swaging to perform insert molding using the mold and obtain the insert-molded bus bar.

4 Claims, 19 Drawing Sheets

(51) Int. Cl.
    *H01B 7/00*           (2006.01)
    *H02G 1/00*           (2006.01)
    *H01R 43/048*       (2006.01)
    *B29C 45/14*         (2006.01)
    *H01R 4/70*           (2006.01)
    *H01R 43/24*         (2006.01)
    *B29L 31/34*         (2006.01)
    *B29K 705/00*       (2006.01)

(52) U.S. Cl.
    CPC ........... *H01R 43/048* (2013.01); *H02G 5/005* (2013.01); *B29K 2705/00* (2013.01); *B29L 2031/34* (2013.01); *B29L 2031/3406* (2013.01); *H01R 4/70* (2013.01); *H01R 43/24* (2013.01)

(58) Field of Classification Search
    USPC .................. 174/119 C, 68.2; 264/272.14
    See application file for complete search history.

(56) References Cited

U.S. PATENT DOCUMENTS

| | | | | |
|---|---|---|---|---|
| 3,636,233 A * | 1/1972 | Swampillai | ............ | H02G 5/063 174/13 |
| 3,662,088 A * | 5/1972 | Wright | ............ | H02G 5/005 118/500 |
| 4,133,101 A * | 1/1979 | Glover | ............ | B23P 11/00 264/156 |
| 4,382,156 A * | 5/1983 | Jodoin | ............ | H02G 5/005 174/72 B |
| 4,401,843 A * | 8/1983 | Harper | ............ | H02G 5/005 174/72 B |
| 4,599,486 A * | 7/1986 | Herrandez | ............ | H02G 5/005 174/72 B |
| 4,804,804 A * | 2/1989 | Hibbert | ............ | H02G 5/10 138/162 |
| 4,867,696 A * | 9/1989 | Demler, Jr. | ............ | H02G 5/005 174/72 B |
| 5,422,440 A * | 6/1995 | Palma | ............ | H02M 7/003 174/133 B |
| 5,579,217 A * | 11/1996 | Deam | ............ | H01L 23/52 174/72 B |
| 5,785,542 A * | 7/1998 | Johnson | ............ | H01R 25/162 439/210 |
| 6,132,859 A * | 10/2000 | Jolly | ............ | F21V 21/002 428/304.4 |
| 6,180,885 B1 * | 1/2001 | Goldman | ............ | H02G 5/06 174/68.2 |
| 6,238,225 B1 * | 5/2001 | Middlehurst | ......... | G06F 13/409 439/212 |
| 6,244,876 B1 * | 6/2001 | Saka | ............ | H02G 5/005 174/59 |
| 6,294,739 B1 * | 9/2001 | Becker | ............ | H01R 4/625 174/126.1 |
| 6,297,452 B1 * | 10/2001 | Pernot | ............ | H02G 5/005 174/149 B |
| 6,329,598 B1 * | 12/2001 | M'Sadoques | ......... | H02G 5/007 174/68.2 |
| 6,376,773 B1 | 4/2002 | Maegawa | | |
| 6,402,569 B1 * | 6/2002 | Spadoni | ............ | H01R 9/2466 439/723 |
| 6,428,335 B1 * | 8/2002 | Bader | ............ | H02G 5/005 439/213 |
| 6,444,910 B1 * | 9/2002 | Goto | ............ | H01R 4/70 174/117 F |
| 6,524,113 B1 * | 2/2003 | Oka | ............ | H01R 9/2458 439/48 |
| 2001/0012736 A1 * | 8/2001 | Miyajima | ............ | H02G 3/16 439/721 |
| 2001/0021611 A1 * | 9/2001 | Onizuka | ............ | H01R 9/2458 439/876 |
| 2001/0025718 A1 * | 10/2001 | Maruyama | ............ | H02G 3/16 174/72 B |
| 2001/0027872 A1 * | 10/2001 | Wagener | ............ | H02G 5/00 174/71 B |
| 2002/0004328 A1 * | 1/2002 | Chevassus-More | ... | H02B 11/04 439/212 |
| 2003/0032338 A1 * | 2/2003 | Chevassus-More | ... | H02G 5/005 439/721 |
| 2003/0090160 A1 * | 5/2003 | Murakami | ............ | H02G 5/005 307/147 |
| 2004/0069527 A1 * | 4/2004 | Vanhoutte | ............ | H02G 5/005 174/149 B |
| 2006/0027390 A1 * | 2/2006 | Suzuki | ............ | H01R 9/226 174/68.2 |
| 2006/0191703 A1 * | 8/2006 | Charrier | ............ | H02B 1/044 174/68.1 |
| 2007/0031646 A1 | 2/2007 | Yamazaki et al. | | |
| 2008/0024959 A1 * | 1/2008 | Keegan | ............ | H02G 5/005 361/677 |
| 2008/0196924 A1 * | 8/2008 | Beulque | ............ | H02G 5/005 174/117 A |
| 2008/0256781 A1 * | 10/2008 | Murakami | ............ | B21D 39/032 29/524.1 |
| 2009/0145625 A1 * | 6/2009 | Bhathija | ............ | H02G 5/06 174/68.2 |
| 2011/0088927 A1 * | 4/2011 | Cuenot | ............ | H02G 5/005 174/110 R |
| 2011/0308834 A1 * | 12/2011 | Takahashi | ............ | H02M 7/003 174/68.2 |
| 2012/0273252 A1 * | 11/2012 | Benavides | ............ | H02G 5/005 174/117 R |
| 2013/0068495 A1 * | 3/2013 | Hadi | ............ | H02G 5/005 174/68.2 |
| 2014/0000927 A1 * | 1/2014 | Hashimoto | ............ | H02G 5/005 174/68.2 |
| 2014/0151082 A1 * | 6/2014 | Erdle | ............ | H02B 1/20 174/68.2 |
| 2014/0216814 A1 * | 8/2014 | Suzuki | ............ | H01M 2/206 174/84 C |
| 2014/0227916 A1 * | 8/2014 | Kato | ............ | H01R 4/186 439/877 |

FOREIGN PATENT DOCUMENTS

| | | | | |
|---|---|---|---|---|
| DE | 10104035 A1 * | 8/2002 | ....... | B29C 45/14467 |
| EP | 0590644 | 4/1994 | | |
| EP | 2236265 | 10/2010 | | |
| FR | 2236265 A1 * | 10/2010 | ........... | B21D 39/032 |
| JP | 55-139240 | 10/1980 | | |
| JP | 2-136301 | 11/1990 | | |
| JP | 2000-348791 | 12/2000 | | |
| JP | 2001-068246 | 3/2001 | | |
| JP | 2006-50830 | 2/2006 | | |
| JP | 3868157 | 10/2006 | | |
| JP | 2010-272446 | 12/2010 | | |

OTHER PUBLICATIONS

Office Action issued in China Counterpart Patent Appl. No. 201380044243.9, dated Jul. 29, 2016.
Search Report issued in European Patent Office (EPO) Patent Application No. 13835213.3, dated Jun. 29, 2016.

* cited by examiner

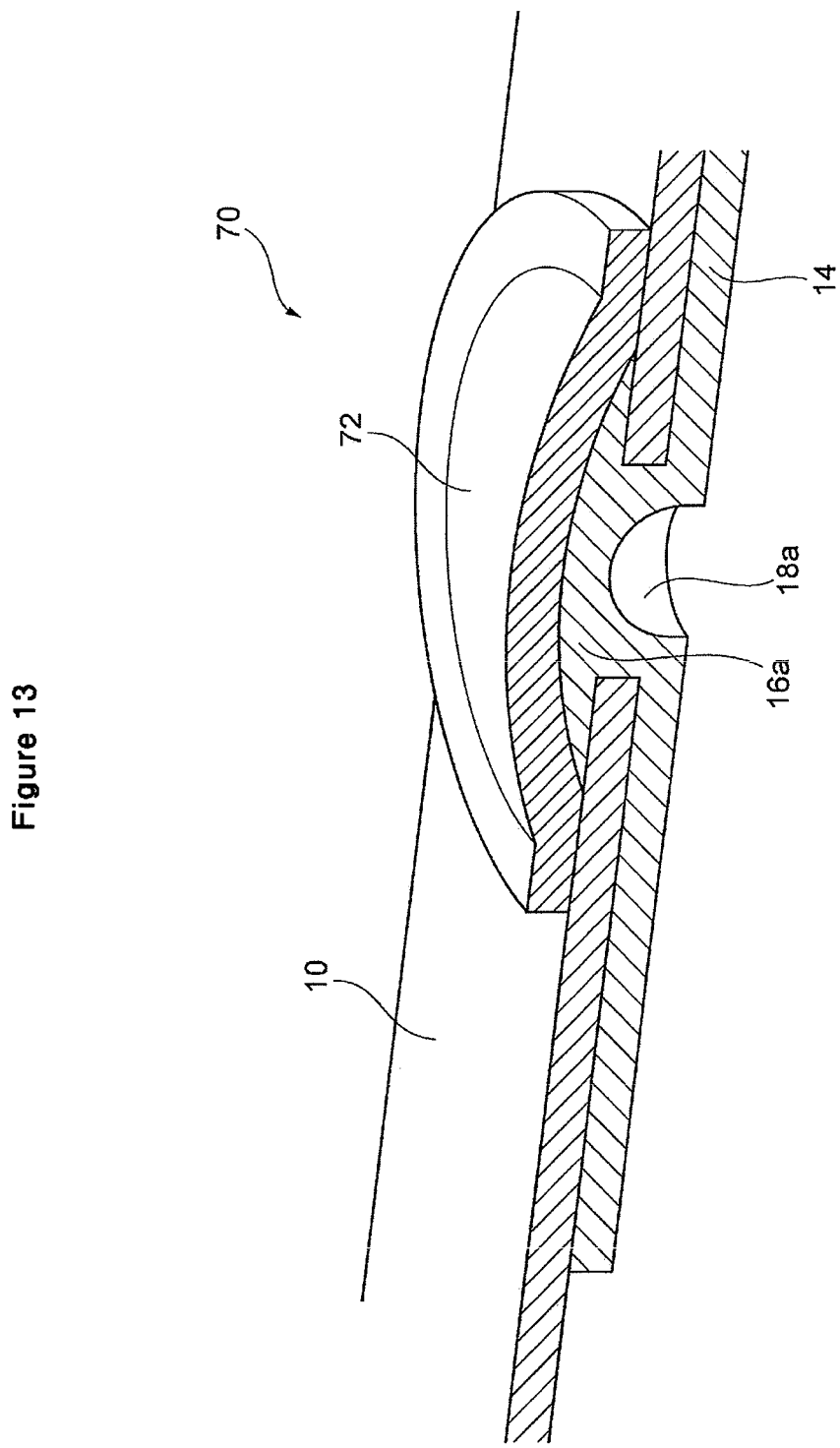

METHOD FOR MANUFACTURING INSERT-MOLDED BUS BAR, AND INSERT-MOLDED BUS BAR

TECHNICAL FIELD

The present invention relates to a method for manufacturing an insert-molded bus bar, and an insert-molded bus bar. More particularly, the present invention relates to a method for manufacturing an insert-molded bus bar from connected bus bars that are bus bars connected to each other using a mold by insert molding, and an insert-molded bus bar manufactured by the manufacturing method.

BACKGROUND ART

Conventionally, a metal conductor referred to as a bus bar that constitutes a part of a connector has been used (for example, see Patent Literature 1). In the technology described in Patent Literature 1, a bus bar is placed in a mold of a connector to perform insert molding, thereby manufacturing a connector including a bus bar.

CITATION LIST

Patent Literature

Patent Literature 1: Japanese Patent No. 3868157

SUMMARY OF INVENTION

Technical Problem

In the conventional technology, a harness for external electrical connection needs to be connected in a separate step to a bus bar of a product such as a connector formed by insert molding. Also, in the conventional technology, a bus bar having a complex shape needs to be fabricated at high cost and placed in a mold to perform insert molding.

Thus, the present invention is achieved to solve the above described problems, and has an object to provide a method for manufacturing an insert-molded bus bar capable of simplifying various steps, and an insert-molded bus bar manufactured by the manufacturing method.

Solution to Problem

To achieve the object, the present invention provides a method for manufacturing an insert-molded bus bar including the steps of: preparing a first bus bar having a through hole and a second bus bar having a protrusion corresponding to the through hole; preparing a mold having therein a swaging member capable of swaging the protrusion; placing the first and second bus bars in the mold with the protrusion of the second bus bar being inserted into the through hole in the first bus bar; swaging the first and second bus bars using the swaging member of the mold to obtain connected bus bars that are the bus bars connected to each other; and injecting a molding material around the connected bus bars that are the bus bars connected to each other by swaging to perform insert molding using the mold and obtain an insert-molded bus bar.

In the method for manufacturing the insert-molded bus bar according to the present invention, the swaging member of the mold is used to obtain the connected bus bars, and the molding material is injected around the connected bus bars to perform insert molding using the mold and obtain the insert-molded bus bar. In this case, the connected bus bars that are the bus bars connected to each other can be obtained in the mold, and the insert-molded bus bar can be obtained using the connected bus bars by the same mold. This eliminates the need to connect a harness for external electrical connection in a separate step, or the need to fabricate a bus bar having a complex shape at high cost. Specifically, according to the present invention, one bus bar may replace the harness, and the bus bars are connected to each other to allow construction of a bus bar having a more complex shape.

In the method for manufacturing an insert-molded bus bar according to the present invention, in the step of obtaining the insert-molded bus bar, insert molding may be performed so that the molding material covers a swaged portion of the connected bus bars. This allows the swaged portion of the connected bus bars to be protected by the molding material.

In the method for manufacturing an insert-molded bus bar according to the present invention, it is preferable that the second bus bar has a recess for positioning that opens in a back side of the protrusion, and in the step of placing the first and second bus bars in the mold, a positioning member of the mold is inserted into the recess to position the second bus bar in the mold. This allows the bus bars to be easily positioned in the mold.

The present invention provides an insert-molded bus bar including: a first bus bar having a through hole; a second bus bar having a protrusion corresponding to the through hole; and a molding material, wherein the protrusion of the second bus bar is inserted into the through hole in the first bus bar and swaged, the first and second bus bars are thus connected to each other to form connected bus bars, and at least part of the connected bus bars are covered with the molding material. This allows a molded article with stronger connection than connection using a harness to be obtained.

In the insert-molded bus bar according to the present invention, a swaged region of the first and second bus bars is preferably covered with an insulating molding material. This ensures insulation of the swaged region.

Advantageous Effects of Invention

According to the present invention, a method for manufacturing an insert-molded bus bar capable of simplifying various steps, and an insert-molded bus bar manufactured by the manufacturing method can be provided.

BRIEF DESCRIPTION OF DRAWINGS

FIG. 1(a) is a plan view of the first bus bar, and FIG. 1(b) is a sectional view of the first bus bar.

FIG. 2(a) is a plan view of the second bus bar, and FIG. 2(b) is a sectional view of the second bus bar.

FIG. 13 is a partial cutaway perspective view, partially enlarged, of the insert-molded bus bar in FIG. 12.

FIG. 14(a) is a perspective view of the swaging member, and FIG. 14(b) is a sectional view of the swaging member.

FIG. 15(a) is a perspective view thereof, and FIG. 15(b) is a sectional view thereof.

FIG. 16(a) is a perspective view thereof, and FIG. 16(b) is a sectional view thereof.

FIG. 17(a) is a perspective view thereof, and FIG. 17(b) is a sectional view thereof.

FIG 18(a) is a perspective view of the positioning member, and FIG. 18(b) is a sectional view of the positioning member.

FIG. 19(a) is a perspective view thereof, and FIG. 19(b) is a sectional view thereof.

DESCRIPTION OF EMBODIMENTS

Figure 1:
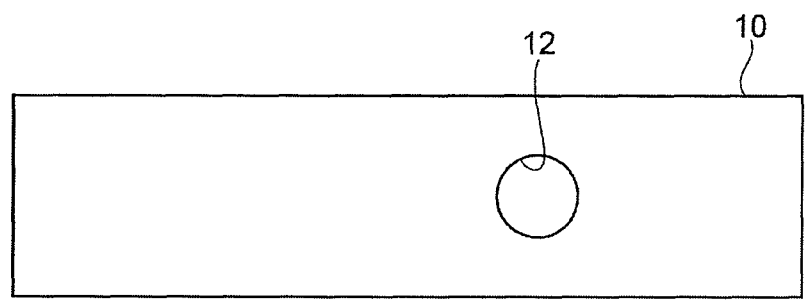
FIGS. 1(a) and 1(b) show a first bus bar.
Figure 1:
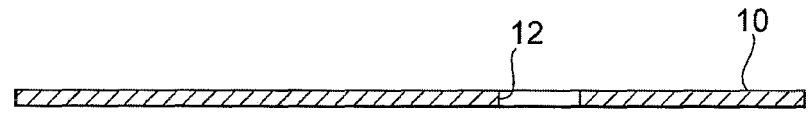

Now, with reference to the accompanying drawings, preferred embodiments of the present invention will be described in detail. In the description, the same components or components having the same functions are denoted by the same reference numerals, and overlapping descriptions will be omitted.

(First embodiment)

Figure 2A:
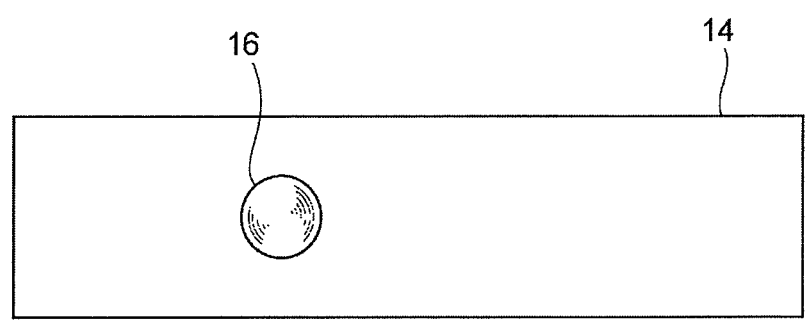
FIGS. 2(a) and 2(b) show a second bus bar.
Figure 2:
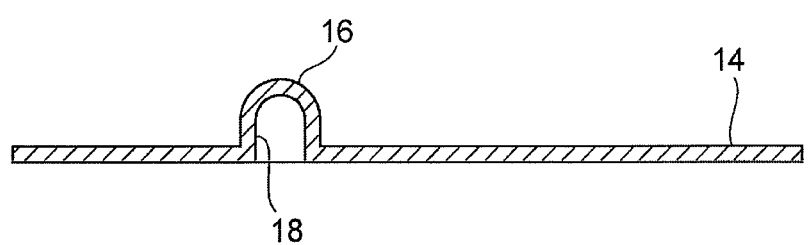

FIGS. 1 and 2 show first and second bus bars 10, 14 used for manufacturing an insert-molded bus bar according to this embodiment. As shown in FIG. 1, the first bus bar 10 is made of a substantially rectangular metal plate having a thickness of, for example, about 1 mm. The first bus bar 10 has a through hole 12 in a region closer to one end (a right side in FIG. 1) from a middle in a longitudinal direction.

As shown in FIG. 2, the second bus bar 14 is made of a substantially rectangular metal plate having a thickness of, for example, about 1 mm like the first bus bar 10. The second bus bar 14 has a protrusion 16 in a region closer to the other end (a left side in FIG. 1) from a middle in a longitudinal direction. The protrusion 16 of the second bus bar 14 has a semispherical tip and a cylindrical base end. The semispherical portion and the cylindrical portion of the protrusion 16 each have a radius slightly smaller than that of the through hole 12 in the first bus bar 10. Thus, the protrusion 16 of the second bus bar 14 can be inserted into the through hole 12 in the first bus bar 10, that is, the protrusion 16 corresponds to the through hole 12. The protrusion 16 has a cavity 18 (recess) therein. The protrusion 16 has a height of, for example, about 3 mm.

Figure 14B:
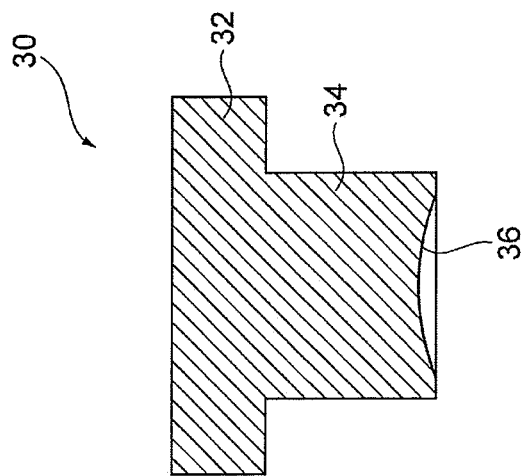
FIGS. 14(a) and 14(b) show a swaging member used in the mold in FIG. 3.
Figure 14A:
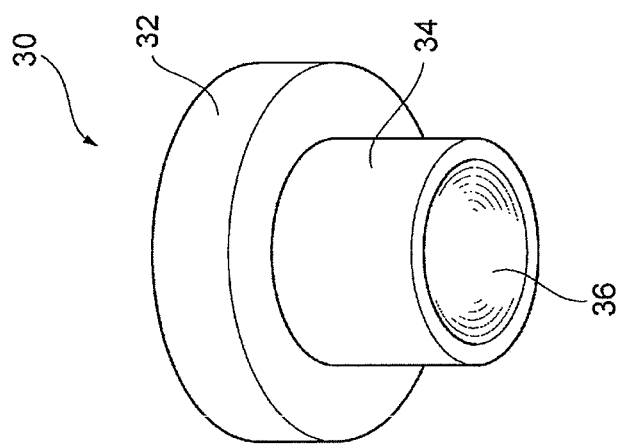

Next, with reference to FIGS. 3, 14 and 18, a mold 20 used for manufacturing an insert-molded bus bar will be described.

The mold 20 is a mold used for general insert molding, and includes upper dies 22, 24 and lower dies 26, 28. The upper die 24 has a space in a middle thereof, and a swaging member 30 is fixedly placed in the space. As shown in FIG. 14, the swaging member 30 includes a disk-shaped shoulder 32, and a cylindrical swaging portion 34 having a smaller diameter than the shoulder 32, and generally has a substantially T-shaped section. The swaging member 30 has a swaging surface 36 with a spherical surface at a lower end thereof. The swaging member 30 is made of, for example, high speed steel.

The lower dies 26, 28 have a space in a middle thereof, and a positioning member 40 is fixedly placed in the space. As shown in FIG. 18, the positioning member 40 includes a substantially cylindrical positioning portion 42, and a cylindrical base 44 having a larger diameter than the positioning portion 42. A semispherical insertion portion 46 is provided at a tip of the positioning portion 42. The positioning member 40 is made of, for example, high speed steel like the swaging member 30.

Figure 3:
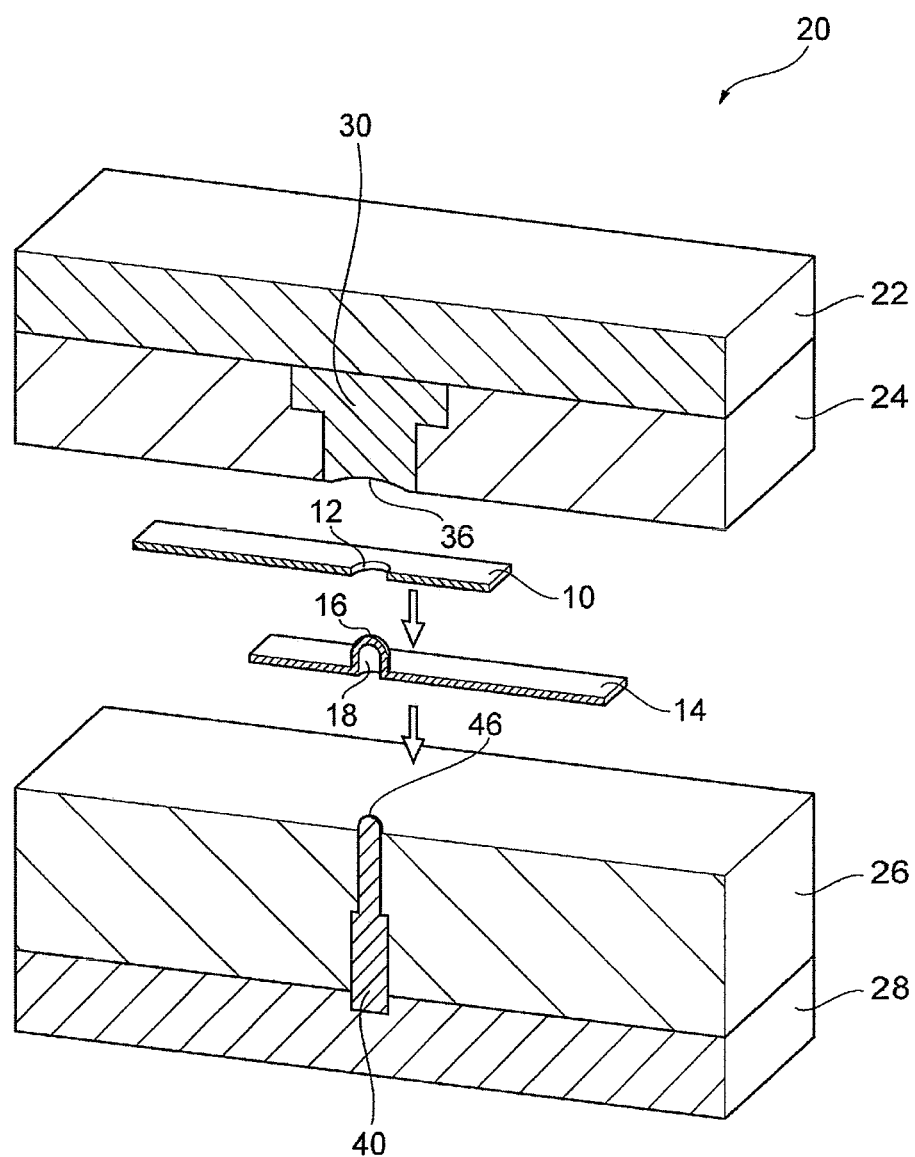
FIG. 3 is a schematic cutaway perspective view of a mold and first and second bus bars according to a first embodiment being prepared.

As shown in FIG. 3 or the like, the swaging member 30 and the positioning member 40 are fixedly placed in the dies 24, 26 so as to vertically face each other. Specifically, the swaging surface 36 of the swaging member 30 and the insertion portion 46 of the positioning member 40 vertically face each other.

Next, with reference to FIGS. 3 to 6, a method for manufacturing an insert-molded bus bar using the mold 20 as described above will be described.

First, the first bus bar 10 and the second bus bar 14 having the above described configurations are prepared, and the mold 20 is prepared (see FIG. 3).

Then, as shown in FIG. 3, the first and second bus bars 10, 14 are aligned so that longitudinal directions thereof are matched and the first and second bus bars 10, 14 are shifted from each other in the longitudinal direction between the upper die 24 and the lower die 26. Then, as indicated by the arrow in FIG. 3, the protrusion 16 of the second bus bar 14 is inserted into the through hole 12 in the first bus bar 10, and in that state, the first and second bus bars 10, 14 are placed on the lower die 26 (see FIG. 4).

Figure 4:
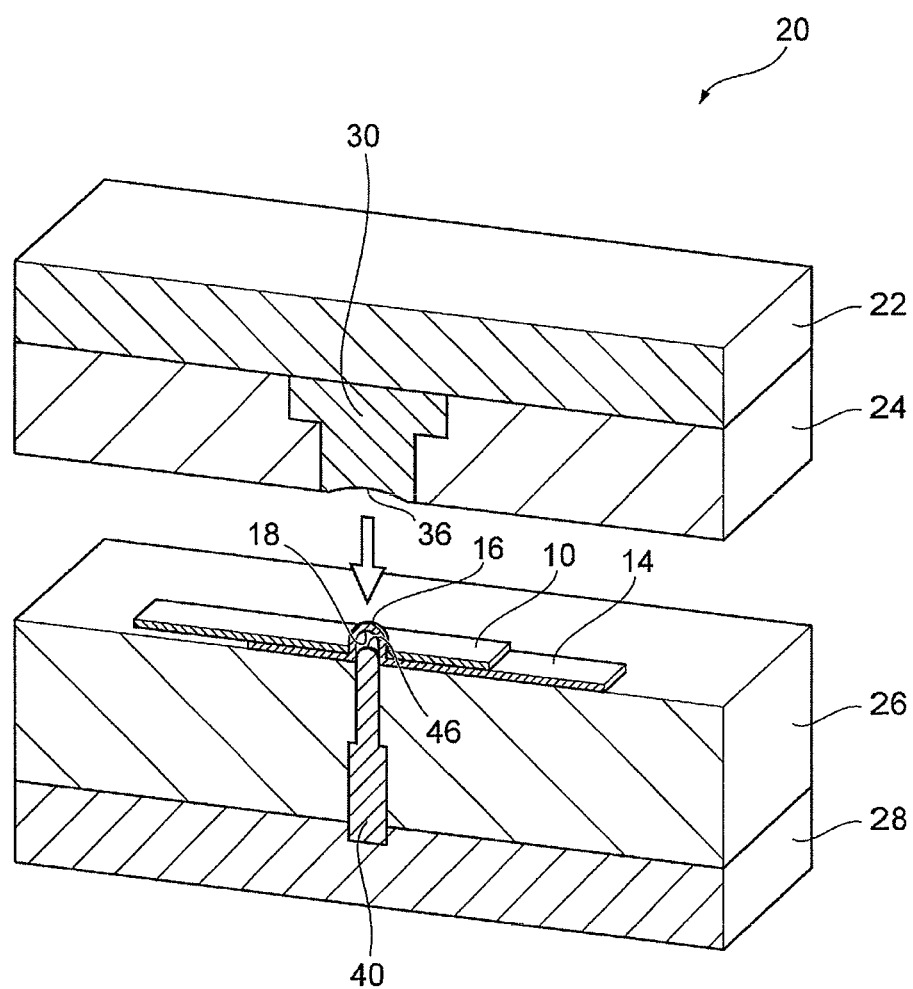
FIG. 4 is a schematic cutaway perspective view of the first and second bus bars being placed on the mold after the state in FIG. 3.

In this placement, since the cavity 18 is formed in a back side of the protrusion 16 of the second bus bar 14, as shown in FIG. 4, the insertion portion 46 of the positioning member 40 is inserted into the cavity 18 with the cavity 18 being not completely filled with the insertion portion 46, thereby positioning the second bus bar 14 on the lower die 26. The first bus bar 10 is positioned by the protrusion 16 of the second bus bar 14, and the positioning member 40 indirectly positions the first bus bar 10 on the lower die 26.

Figure 5:
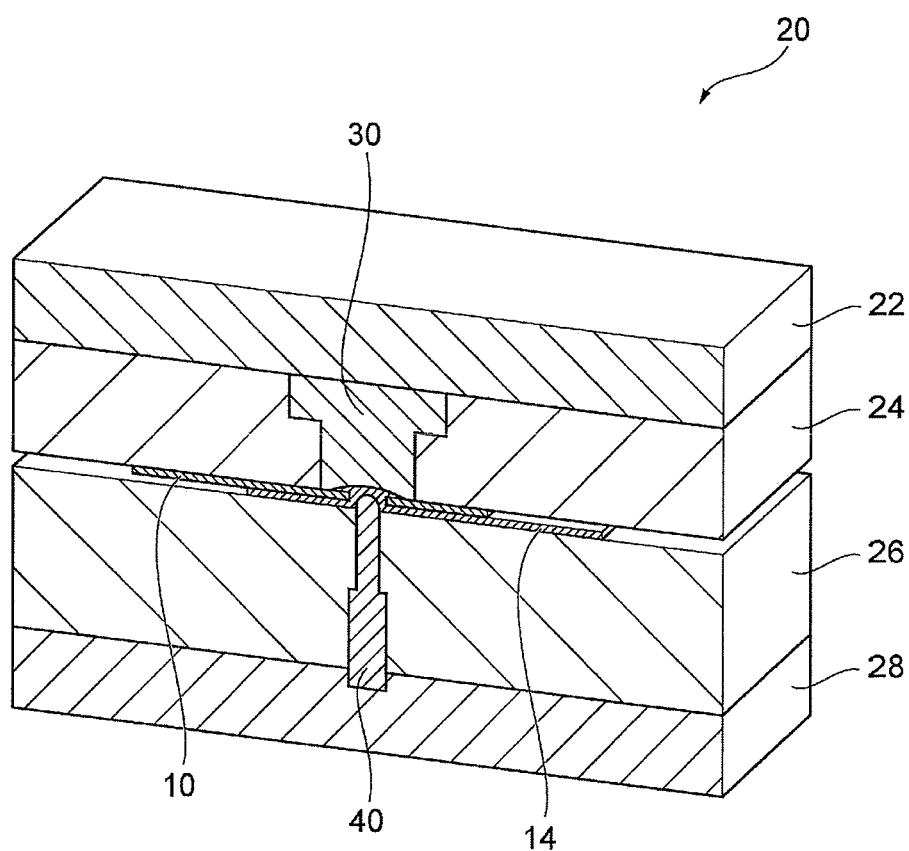
FIG. 5 is a schematic cutaway perspective view of the first and second bus bars being swaged to form connected bus bars after the state in FIG. 4.

When the first and second bus bars 10, 14 are positioned on the lower die 26, the upper dies 22, 24 are integrally lowered toward the lower die 26 as indicated by the arrow in FIG. 4. By this lowering motion, as shown in FIG. 5, the swaging surface 36 of the swaging member 30 secured in the upper dies 22, 24 and an upper surface of the insertion portion 46 of the positioning member 40 press the protrusion 16 of the second bus bar 14 so as to be larger than the diameter of the through hole 12 in the first bus bar 10, and deforms the protrusion 16 into a swaged region 16a that is tightly caught on a part of an upper surface of the first bus bar 10 (see FIG. 7). In this case, the positioning member 40 functions as another swaging member.

The swaged region 16a is thus formed to first form connected bus bars that are the first and second bus bars 10, 14 secured (connected) to each other. Due to the pressing, the swaged region 16a has a reduced height of, for example, about 2 mm.

Then, when the connected bus bars 10, 14 are formed, a predetermined molding material is injected into the mold 20 so as to cover predetermined areas of the connected bus bars 10, 14 to perform predetermined insert molding using the mold 20. An example of the molding material includes, for example, polyphenylene sulfide (PPS) resin. For molding conditions or the like, a conventional technology may be applied as appropriate.

Figure 6:
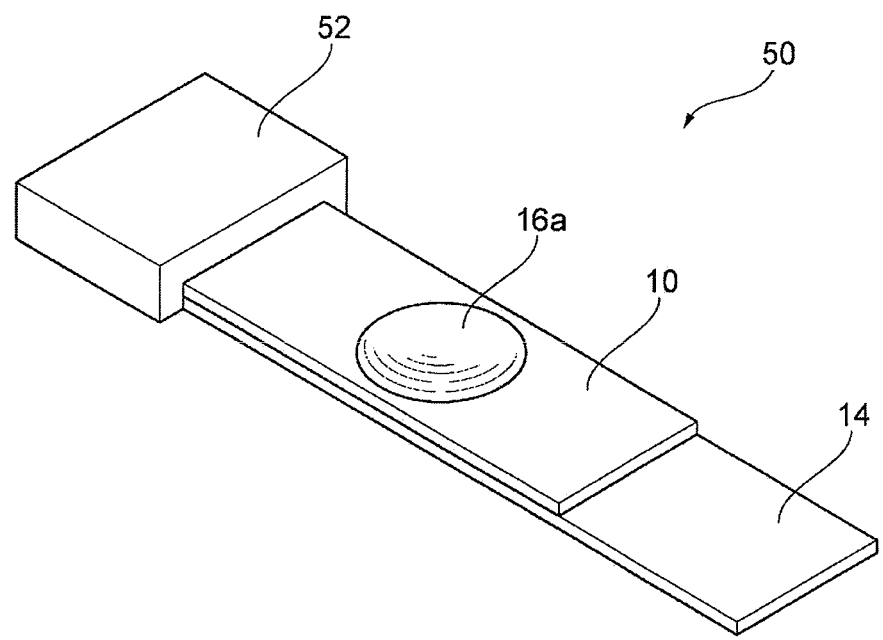
FIG. 6 is a perspective view of an insert-molded bus bar according to the first embodiment.
Figure 7:
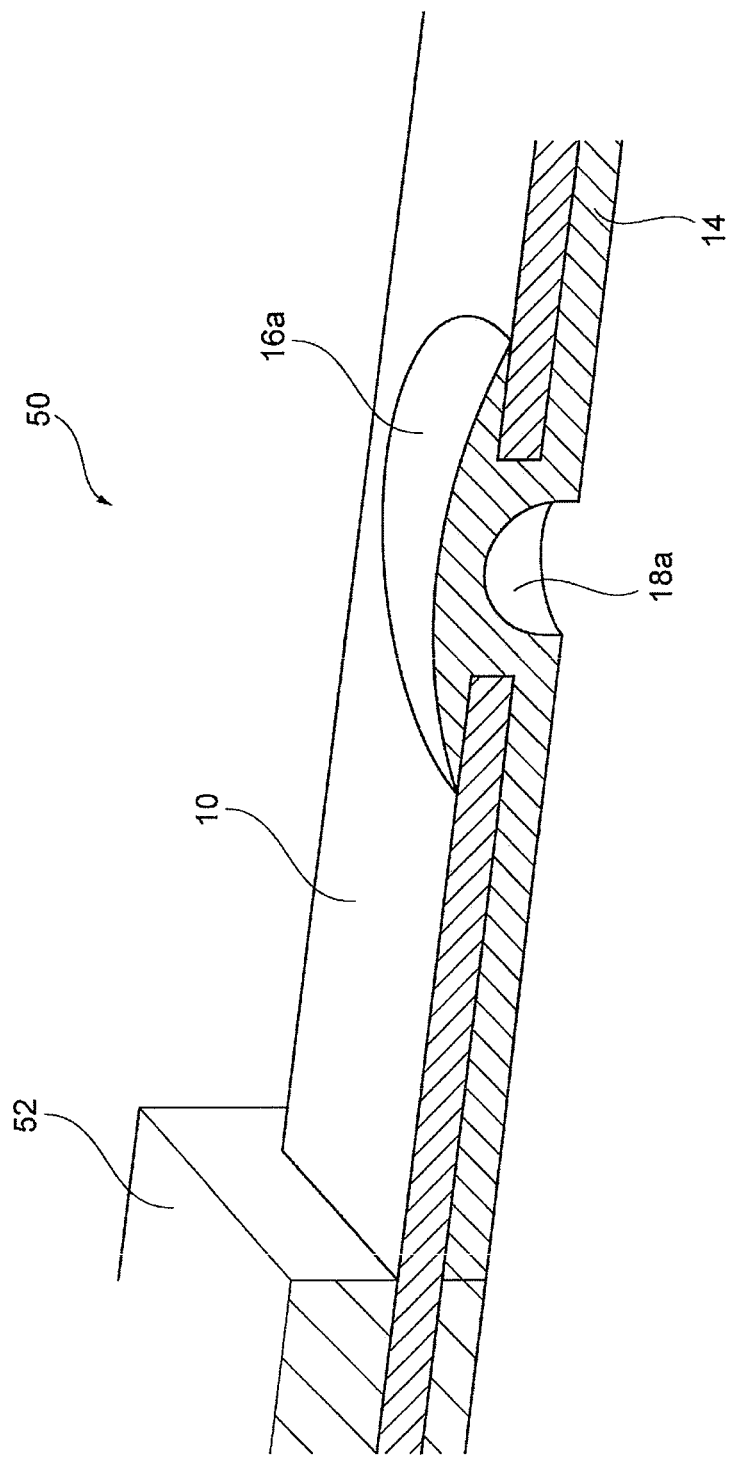
FIG. 7 is a partial cutaway perspective view, partially enlarged, of the insert-molded bus bar in FIG. 6.

From the above, as shown in FIGS. 6 and 7, an insert-molded bus bar 50 is obtained.

The insert-molded bus bar 50 includes the first and second bus bars 10, 14 and a molding material portion 52. As described above, in the insert-molded bus bar 50, the protrusion 16 of the second bus bar is inserted into the through hole 12 in the first bus bar 10 and swaged, and the bus bars are thus connected to each other. The insert-molded bus bar 50 has a configuration in which the molding material portion 52 covers one end (a left side in FIGS. 6 and 7) of the connected bus bars 10, 14 connected and secured to each other.

In the insert-molded bus bar 50, the protrusion 16 of the second bus bar is deformed into the swaged region 16a having a surface along the swaging surface 36 by pressing using the swaging member 30, and the cavity 18 is also deformed into a cavity 18a having an inner peripheral surface along the surface of the insertion portion 46. Needless to say, the insert-molded bus bar 50 may have a configuration in which the molding material covers the entire connected bus bars 10, 14.

As described above, in the method for manufacturing the insert-molded bus bar 50 according to this embodiment, the connected bus bars 10, 14 are obtained using the swaging member 30 of the mold 20, and the molding material 52 is injected around the connected bus bars 10, 14 to perform insert molding using the mold 20 and obtain the insert-molded bus bar 50. Thus, the connected bus bars 10, 14 that are the bus bars 10, 14 connected to each other can be obtained in the mold 20, and the insert-molded bus bar 50 can be obtained using the connected bus bars 10, 14 by the same mold 20.

This eliminates the need to connect a harness for external electrical connection in a separate step, or the need to fabricate a bus bar having a complex shape at high cost as in a conventional case. Specifically, with the manufacturing method according to this embodiment, one bus bar 14 may replace the harness, and the bus bars 10, 14 are connected to each other to allow construction of a bus bar having a more complex shape.

In the method for manufacturing the insert-molded bus bar 50 according to this embodiment, the second bus bar 14 has the cavity 18 for positioning that opens in the back side of the protrusion 16, and in the step of placing the first and second bus bars 10, 14 in the mold 20, the insertion portion 46 of the positioning member 40 of the mold 20 is inserted into the cavity 18 to position the second bus bar 14 in the mold 20. This allows the bus bars 10, 14 to be easily positioned in the mold 20.

The insert-molded bus bar 50 manufactured by the manufacturing method according to this embodiment includes: the first bus bar 10 having the through hole 12; the second bus bar 14 having the protrusion 16 corresponding to the through hole 12; and the molding material portion 52, wherein the protrusion 16 of the second bus bar 14 is inserted into the through hole 12 in the first bus bar 10 and swaged, the first and second bus bars 10, 14 are thus connected to each other to form the connected bus bars 10, 14, and parts of the connected bus bars 10, 14 are covered with the molding material portion 52. This allows the resin molded article 50 with stronger connection than connection using a harness to be obtained.

(Second embodiment)

Next, a method for manufacturing an insert-molded bus bar according to a second embodiment of the present invention will be described. First and second bus bars used in the manufacturing method according to this embodiment are the same as in the first embodiment, while a configuration of a mold is partially different.

Figure 8:
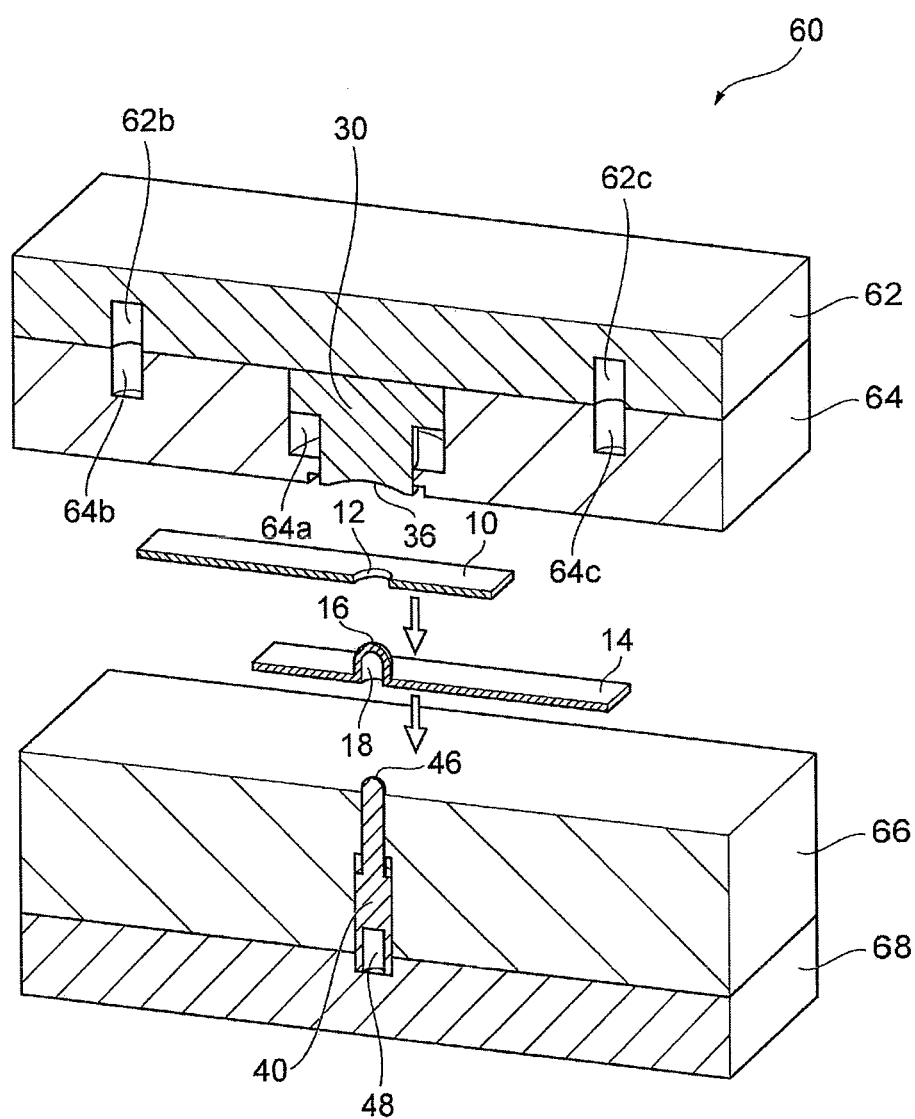
FIG. 8 is a schematic cutaway perspective view of a mold and first and second bus bars according to a second embodiment being prepared.

As shown in FIG. 8, a mold 60 used in this embodiment includes upper dies 62, 64 and lower dies 66, 68 as in the first embodiment, but is different in that a swaging member 30 is movably placed in a space located in a middle of the upper die 64. Specifically, the swaging member 30 is placed in the upper die 64 with a predetermined region of movement 64a. Although not shown, a resilient member 100 (for example, a spring or the like) is placed in the region of movement 64a, and is biased so that the swaging member 30 is not moved when the upper dies 62 and 64 are in contact, while the swaging member 30 is moved upward when the upper dies 62, 64 are separated. Cavities 62b, 64b, 62c, 64c are also provided in opposite end sides of the upper dies 62, 64, and resilient members such as springs are placed therein.

This embodiment is similar to the first embodiment in that the positioning member 40 is placed in a space located in a middle of the lower dies 66, 68, but is different in that the positioning member 40 is movably placed. In this embodiment, a cavity 48 is provided at a lower end of the positioning member 40, and a resilient member 200 such as a spring may be placed in the cavity 48.

Next, with reference to FIGS. 8 to 13, a method for manufacturing an insert-molded bus bar using the mold 60 as described above will be described.

First, as in the first embodiment, a first bus bar 10 and a second bus bar 14 are prepared, and the mold 60 is prepared.

Then, as shown in FIG. 8, the first and second bus bars 10, 14 are aligned so that longitudinal directions thereof are matched and the first and second bus bars 10, 14 are shifted from each other in the longitudinal direction between the upper die 64 and the lower die 66. Then, as indicated by the arrow in FIG. 8, a protrusion 16 of the second bus bar 14 is inserted into a through hole 12 in the first bus bar 10, and in that state, the first and second bus bars 10, 14 are placed on the lower die 66 (see FIG. 9).

Figure 9:
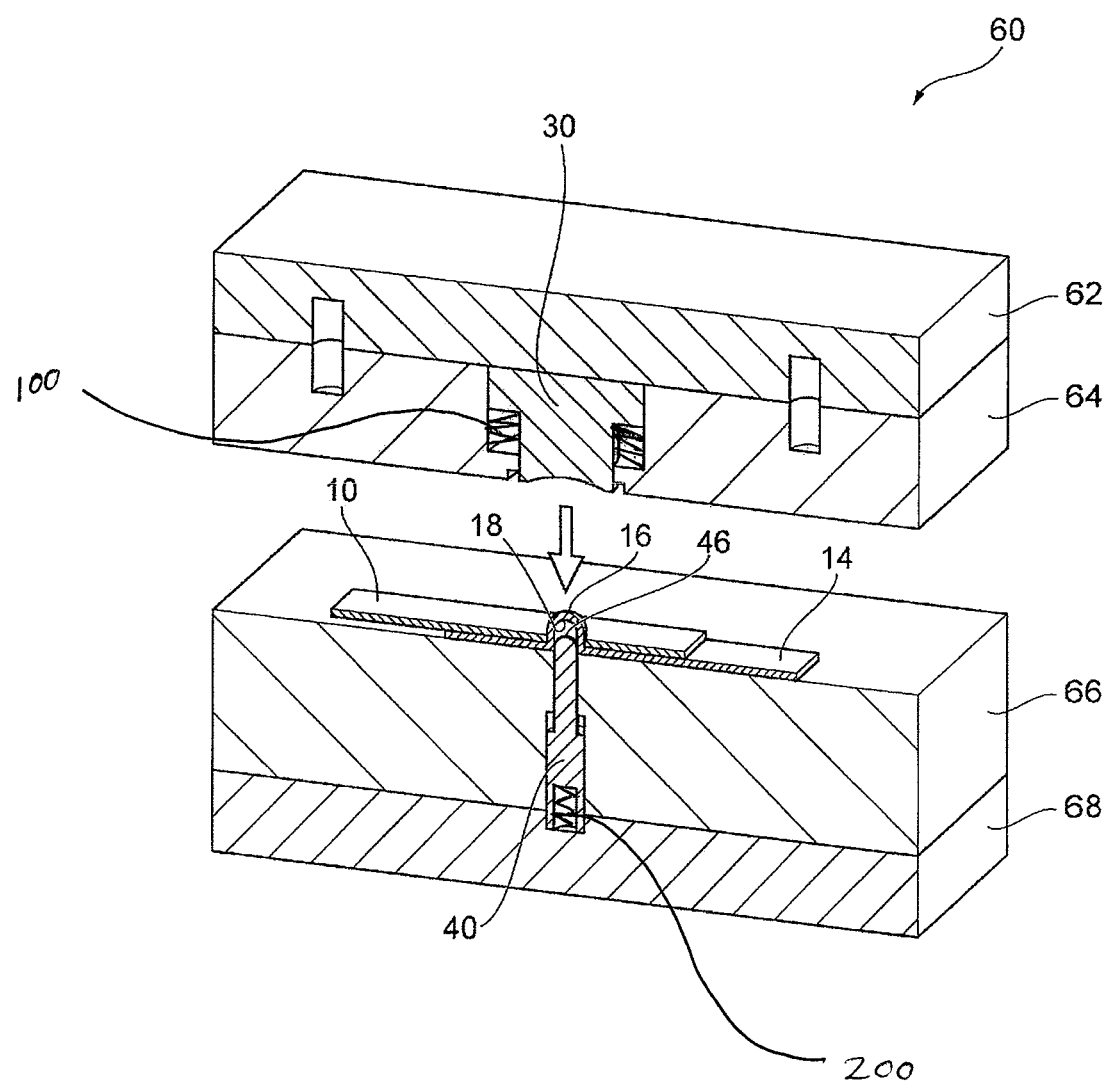
FIG. 9 is a schematic cutaway perspective view of the first and second bus bars being placed on the mold after the state in FIG. 8.

In this placement, since a cavity 18 is formed in a back side of the protrusion 16 of the second bus bar 14, as shown in FIG. 9, an insertion portion 46 of a positioning member 40 is inserted into the cavity 18 with the cavity 18 being not completely filled with the insertion portion 46, thereby positioning the second bus bar 14 on the lower die 66. The first bus bar 10 is positioned by the protrusion 16 of the second bus bar 14, and the positioning member 40 indirectly positions the first bus bar 10 on the lower die 66.

Figure 10:
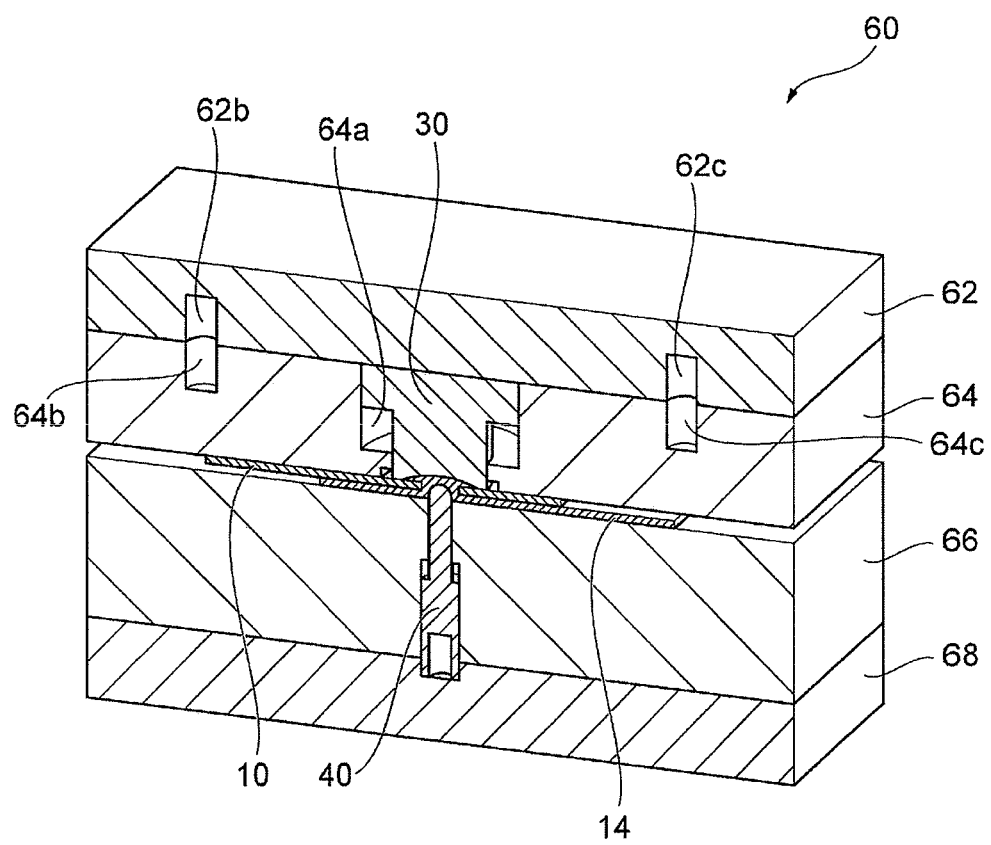
FIG. 10 is a schematic cutaway perspective view of the first and second bus bars being swaged to form connected bus bars after the state in FIG. 9.

When the first and second bus bars 10, 14 are positioned on the lower die 66, the upper dies 62, 64 are integrally lowered toward the lower die 66 as indicated by the arrow in FIG. 9. By this lowering motion, as shown in FIG. 10, a swaging surface 36 of a swaging member 30 or the like placed in the upper dies 62, 64 presses the protrusion 16 of the second bus bar 14 so as to be larger than a diameter of the through hole 12 in the first bus bar 10, and deforms the protrusion 16 into a swaged region 16a that is tightly caught on a part of an upper surface of the first bus bar 10 (see FIG. 13). The swaged region 16a is formed to first form connected bus bars that are the first and second bus bars 10, 14 secured to each other.

Figure 11:
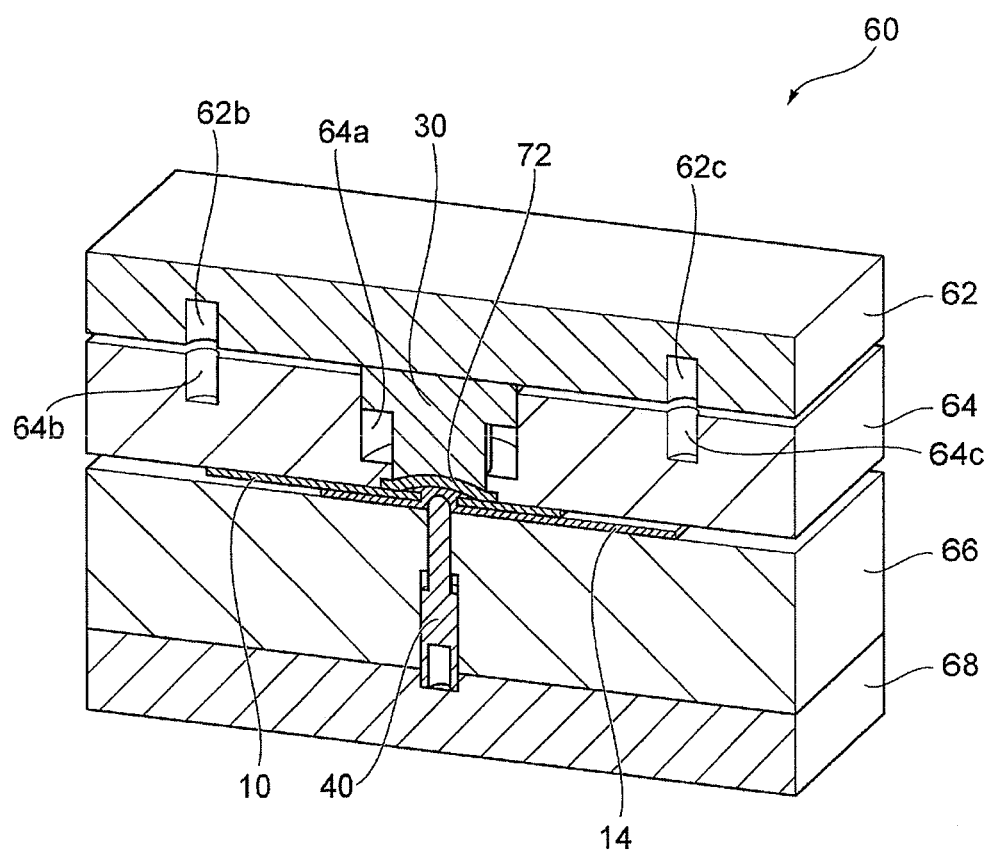
FIG. 11 is a schematic cutaway perspective view of a molding material being injected around the connected bus bars to perfoun insert molding after the state in FIG. 10.

Then, when the connected bus bars 10, 14 are formed, the upper die 62 is moved upward a predetermined distance from the upper die 64 (see FIG. 11). With this movement, the swaging member 30 is moved upward a predetermine distance by the resilient member provided in the region of movement 64a to form a predetermined clearance between the swaging surface 36 and a surface of the swaged region 16a. Then, as shown in FIG. 11, a molding material 72 is injected into the mold 60 so as to cover the swaged region 16a of the connected bus bars 10, 14 to perform predetermined insert molding using the mold 60.

Figure 12:
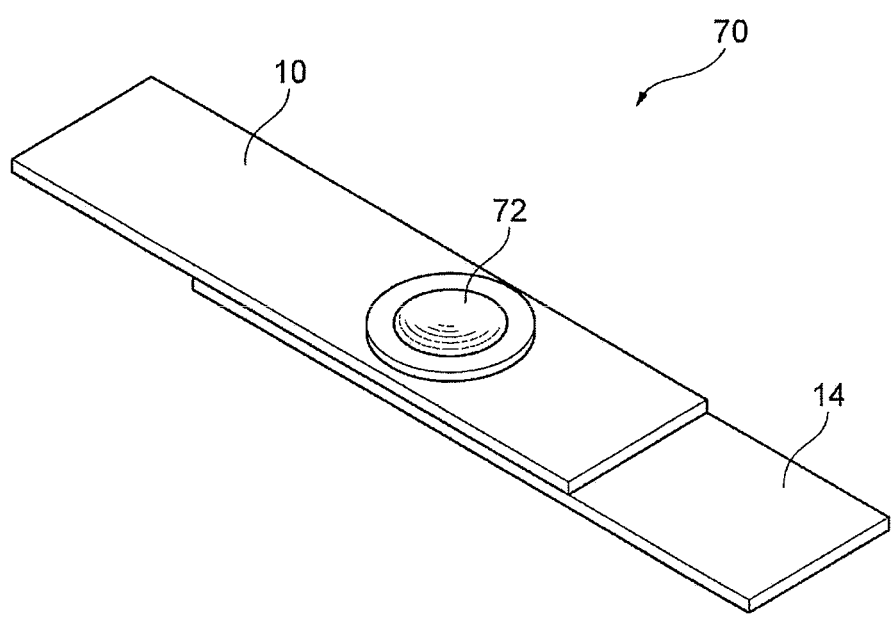
FIG. 12 is a perspective view of an insert-molded bus bar according to the second embodiment.

From the above, as shown in FIGS. 12 and 13, an insert-molded bus bar 70 is obtained.

The insert-molded bus bar 70 includes the first and second bus bars 10, 14 and the molding material portion 72. As in the first embodiment, in the insert-molded bus bar 70, the protrusion 16 of the second bus bar is inserted into the through hole 12 in the first bus bar 10 and swaged, and the bus bars are thus connected to each other. The insert-molded bus bar 70 has a configuration in which the molding material portion 72 covers the swaged region 16a of the connected bus bars 10, 14 connected and secured to each other.

As described above, in the method for manufacturing the insert-molded bus bar 70 according to this embodiment, as in the first embodiment, the connected bus bars 10, 14 are obtained using the swaging member 30 of the mold 60, and the molding material 72 is injected on the swaged region 16a of the connected bus bars 10, 14 to perform insert molding using the mold 60 and obtain the insert-molded bus bar 70. Thus, the connected bus bars 10, 14 that are the bus bars 10, 14 connected to each other can be obtained in the mold 60, and the insert-molded bus bar 70 can be obtained using the connected bus bars 10, 14 by the same mold 60.

In the method for manufacturing the insert-molded bus bar 70 according to this embodiment, in the step of obtaining the insert-molded bus bar 70, insert molding is performed so that the molding material 72 covers the swaged region 16a of the connected bus bars 10, 14. This allows the swaged region 16a of the connected bus bars 10, 14 to be protected by the molding material 72. Specifically, in the insert-molded bus bar 70, the swaged region 16a of the first and second bus bars is covered with the insulating molding material 72. Thus, the insert-molded bus bar 70 according to this embodiment can ensure insulation of the swaged region 16a.

Figure 15B:
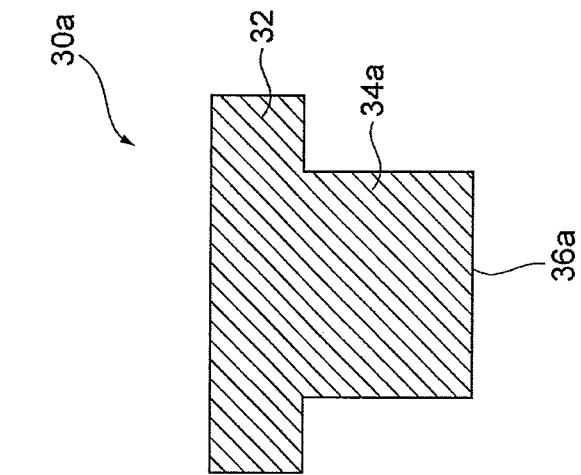
FIGS. 15(a) and 15(b) show a variant of the swaging member.
Figure 15A:
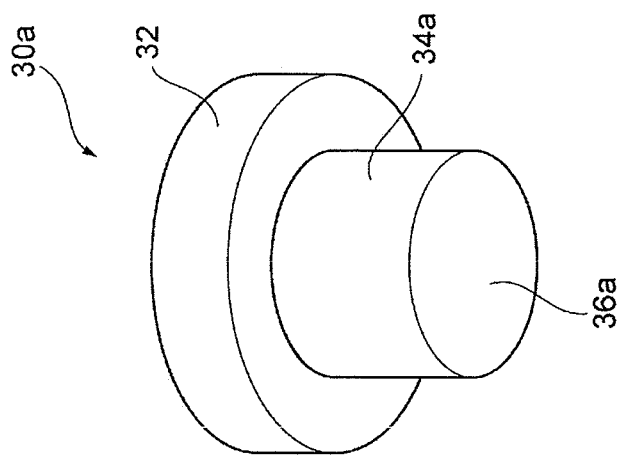
Figure 16B:
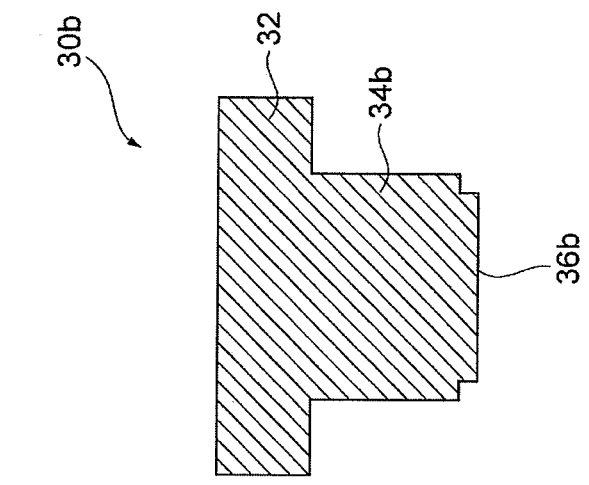
FIGS. 16(a) and 16(b) show another variant of the swaging member.
Figure 16:
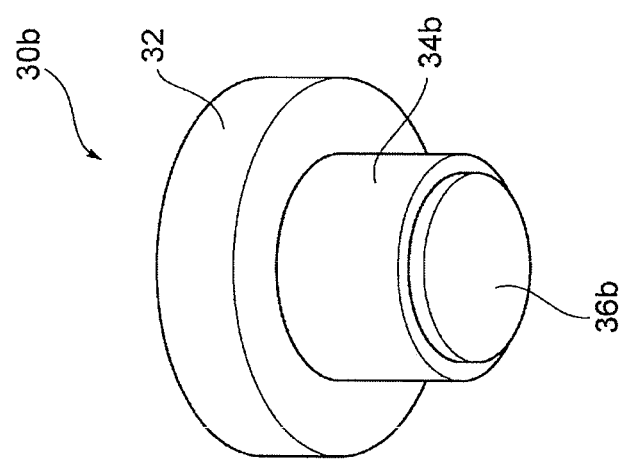

The present invention is not limited to the above described embodiments, but different variants may be applied. For example, in the above described embodiments, the example of using the swaging member 30 in FIG. 14 as a swaging member is provided. However, as shown in FIG. 15, a swaging member 30a may be used having no spherical swaging surface 36 but having a swaging portion 34a with a horizontal surface 36a, or as shown in FIG. 16, a swaging member 30b may be used having a tip 36b with a smaller diameter than a swaging portion 34b.

Figure 17B:
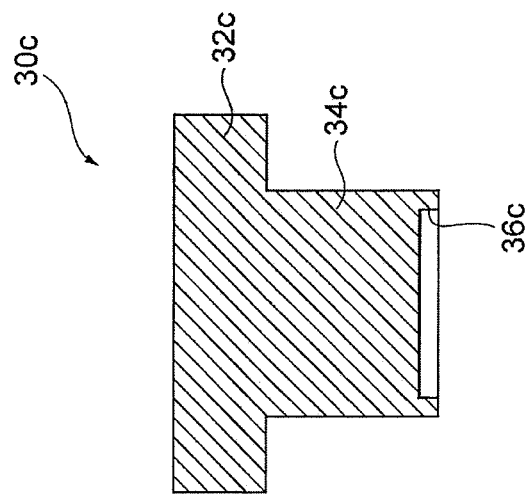
FIGS. 17(a) and 17(b) show a further variant of the swaging member.
Figure 17A:
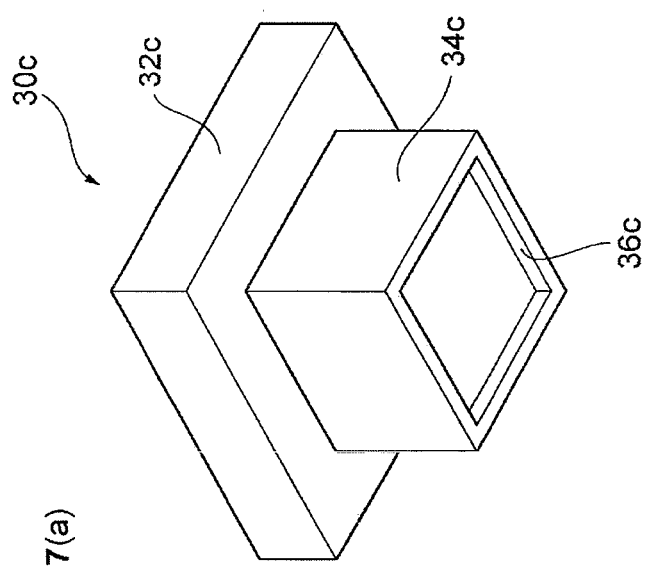

Further, in addition to the protrusion 16 of the second bus bar 14 being swaged so as to have a circular swaged region 16a when seen from above, a swaging member 30c having a rectangular swaging surface 36c as shown in FIG. 17 may be used to swage the protrusion 16 of the second bus bar 14 so as to have a rectangular swaged region 16a when seen from above.

Figure 18A:
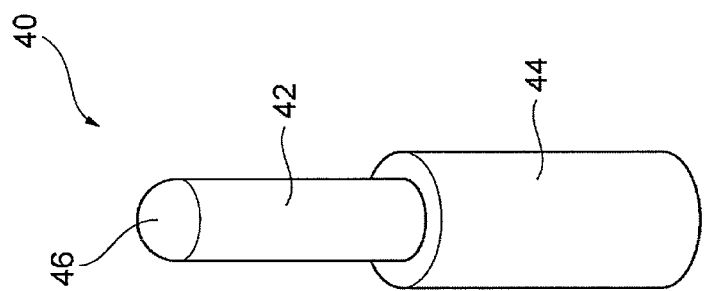
FIGS. 18(a) and 18(b) show a positioning member used in the mold in FIG 3.
Figure 18B:
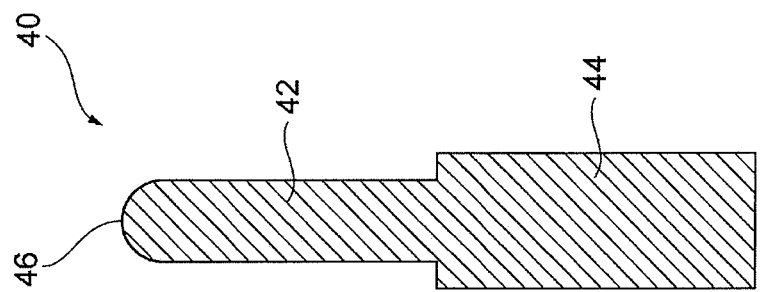
Figure 19B:
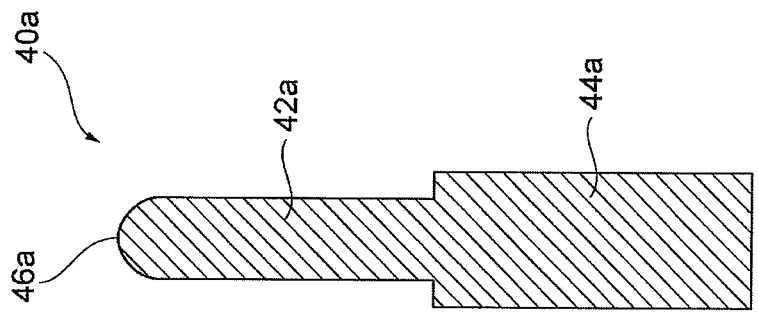
FIGS. 19(a) and 19(b) show a variant of the positioning member.
Figure 19A:
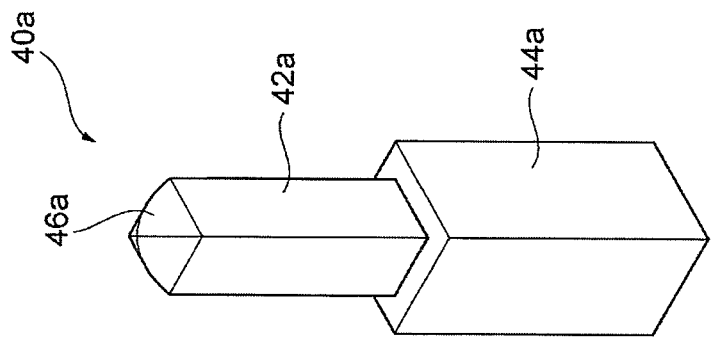

In the above described embodiment, the example of using the positioning member 40 in FIG. 18 as a positioning member is provided. However, as shown in FIG. 19, a positioning member 40a including a prismatic positioning portion 42a and a base 44a may be used. In this case, an insertion portion 46a may be formed differently from the insertion portion 46 of the positioning member 40.

In the above described embodiment, the first and second bus bars 10, 14 are placed in parallel so that the longitudinal directions thereof are matched to form the connected bus bars, but the first and second bus bars 10, 14 may be placed so that the longitudinal directions thereof intersect with each other (for example, in an L shape) to manufacture an insert-molded bus bar. Such combination of placement allows a complex bus bar assembly to be easily fabricated from simple rectangular bus bars.

INDUSTRIAL APPLICABILITY

The present invention may be applied to connector products including a bus bar and manufacture thereof.

REFERENCE SIGNS LIST 10 first bus bar
12 through hole
14 second bus bar
16 protrusion
16a swaged region
18 cavity
20, 60 mold
30, 30a, 30b, 30c swaging member
40, 40a positioning member
50, 70 insert-molded bus bar
52, 72 molding material portion

The invention claimed is:

1. A method for manufacturing an insert-molded bus bar, the method comprising:
preparing a first bus bar having a through hole and a second bus bar having a protrusion corresponding to the through hole;
preparing a mold having an upper die and a lower die, wherein the mold is provided therein with a swaging member capable of swaging the protrusion, wherein the swaging member is movably placed in a space located in a middle of a first body of the upper die so as to have a predetermined range of movement, and wherein a resilient member is placed in the space located in the middle of the first body of the upper die and is configured to bias the swaging member;
placing the first and second bus bars in the mold with the protrusion of the second bus bar being inserted into the through hole in the first bus bar;
swaging the first and second bus bars using the swaging member of the mold to obtain connected bus bars in which the bus bars are connected to each other;
forming a predetermined clearance between the swaging surface and a surface of a swaged region of the connected bus bars, wherein, by moving a second body of the upper die relative to the first body of the upper die such that a distance between the first body of the upper die and the second body of the upper die increases, the swaging member is moved a predetermined distance from the surface of the swaged region by the resilient member provided in the space located in the middle of the first body of the upper die, thereby providing the predetermined clearance; and injecting a molding material around the connected bus bars that are connected to each other by swaging to perform insert molding using the mold and obtain the insert-molded bus bar.

2. The method for manufacturing an insert-molded bus bar according to claim 1, wherein in injecting the molding material, insert molding is performed so that the molding material covers a swaged portion of the connected bus bars.

3. The method for manufacturing an insert-molded bus bar according to claim 1, wherein the second bus bar has a space for positioning that opens in a back side of the protrusion, and wherein, in placing the first and second bus bars in the mold, a positioning member of the mold is inserted into the space of the second bus bar to position the second bus bar in the mold.

4. A method for manufacturing an insert-molded bus bar, the method comprising:

preparing a first bus bar having a through hole and a second bus bar having a protrusion corresponding to the through hole;

preparing a mold having therein a swaging member capable of swaging the protrusion, placing the first and second bus bars in the mold with the protrusion of the second bus bar being inserted into the through hole in the first bus bar;

swaging the first and second bus bars using the swaging member of the mold to obtain connected bus bars in which the bus bars are connected to each other; and injecting a molding material around the connected bus bars that are connected to each other by swaging to perform insert molding using the mold and obtain the insert-molded bus bar, wherein the second bus bar has a space for positioning that opens in a back side of the protrusion, and wherein, in placing the first and second bus bars in the mold, a positioning member of the mold is inserted into the space of the second bus bar to position the second bus bar in the mold, wherein the positioning member is movably placed, wherein a cavity is provided at a lower end of the positioning member, and wherein a resilient member is placed in the cavity and is configured to bias the positioning member.

* * * * *

UNITED STATES PATENT AND TRADEMARK OFFICE
CERTIFICATE OF CORRECTION

PATENT NO. : 9,843,175 B2
APPLICATION NO. : 14/424708
DATED : December 12, 2017
INVENTOR(S) : Asano et al.

Page 1 of 1

It is certified that error appears in the above-identified patent and that said Letters Patent is hereby corrected as shown below:

In the Claims

Column 9, Line 9 (Claim 2), change "wherein in" to -- wherein, in --.

Signed and Sealed this
Twenty-fourth Day of July, 2018

Andrei Iancu
*Director of the United States Patent and Trademark Office*